United States Patent
Meng et al.

(10) Patent No.: US 11,754,327 B2
(45) Date of Patent: Sep. 12, 2023

(54) AIR CONDITIONING SYSTEM

(71) Applicants: Qingdao Haier Air-conditioning Electronic Co., Ltd, Shandong (CN); Haier Smart Home Co., Ltd., Shandong (CN)

(72) Inventors: Qingliang Meng, Qingdao (CN); Qiang Song, Qingdao (CN); Jiangbin Liu, Qingdao (CN); Jingsheng Liu, Qingdao (CN)

(73) Assignees: Qingdao Haier Air-conditioning Electronic Co., Ltd., Qingdao (CN); Haier Smart Home Co., Ltd., Qingdao (CN)

( * ) Notice: Subject to any disclaimer, the term of this patent is extended or adjusted under 35 U.S.C. 154(b) by 386 days.

(21) Appl. No.: 17/256,766

(22) PCT Filed: Dec. 26, 2019

(86) PCT No.: PCT/CN2019/128657
§ 371 (c)(1),
(2) Date: Dec. 29, 2020

(87) PCT Pub. No.: WO2021/012608
PCT Pub. Date: Jan. 28, 2021

(65) Prior Publication Data
US 2021/0180845 A1 Jun. 17, 2021

(30) Foreign Application Priority Data

Jul. 25, 2019 (CN) .......................... 201910677071.8

(51) Int. Cl.
*F25B 49/02* (2006.01)
*F25B 41/345* (2021.01)
(Continued)

(52) U.S. Cl.
CPC .............. *F25B 49/02* (2013.01); *F25B 13/00* (2013.01); *F25B 41/34* (2021.01); *F25B 41/345* (2021.01);
(Continued)

(58) Field of Classification Search
CPC .. F25B 49/02; F25B 13/00; F25B 2341/0014; F25B 2400/0407; F25B 41/345; F25B 41/40; F04F 5/24
See application file for complete search history.

(56) References Cited

U.S. PATENT DOCUMENTS

2014/0260404 A1\* 9/2014 Verma .................... F25B 25/005
62/333
2016/0313013 A1\* 10/2016 Chaudhry ............... F25B 13/00

FOREIGN PATENT DOCUMENTS

CN 203964434 U 11/2014
CN 104976813 A 10/2015
(Continued)

OTHER PUBLICATIONS

International Search Report and Written Opinion dated Apr. 10, 2020 in corresponding International Application No. PCT/CN2019/128657; 9 pages.

*Primary Examiner* — Henry T Crenshaw
(74) *Attorney, Agent, or Firm* — Maier & Maier, PLLC

(57) ABSTRACT

An air conditioning system, which includes an indoor heat exchanger, an outdoor heat exchanger, a compressor, a throttling device, a four-way valve and an ejection device; the indoor heat exchanger, the outdoor heat exchanger, the compressor and the throttling device form a closed-loop refrigerant circulation circuit, the four-way valve is configured to switch the air conditioning system between a cooling mode and a heating mode, and the ejection device is configured to be capable of being connected to a discharge side of the compressor when the air conditioning system
(Continued)

executes the heating mode, so as to improve a heating effect of the air conditioning system. This system has a lower cost and a simple structure for easier maintenance, and the energy efficiency ratio is improved, so that the heating effect of the air conditioning system can be improved when the air conditioning system executes the heating mode.

2 Claims, 2 Drawing Sheets

(51) Int. Cl.
  *F25B 41/34* (2021.01)
  *F25B 13/00* (2006.01)
(52) U.S. Cl.
  CPC .............. *F25B 2313/02741* (2013.01); *F25B 2400/0407* (2013.01)

(56) References Cited

FOREIGN PATENT DOCUMENTS

| | | | |
|---|---|---|---|
| CN | 105805981 A | | 7/2016 |
| CN | 105928265 A | | 9/2016 |
| CN | 105972773 A | | 9/2016 |
| CN | 106016809 A | | 10/2016 |
| CN | 108278791 | * | 7/2018 |
| JP | 2007-101159 A | | 4/2007 |

* cited by examiner

| working condition | | ordinary cooling system | | |
|---|---|---|---|---|
| condensation temperature /°C | evaporation temperature /°C | discharge temperature | volumetric cooling capacity | energy efficiency ratio |
| 56 | -10 | 105.885 | 2992 | 3.13 |
| 56 | -15 | 106.81 | 2595 | 2.86 |
| 56 | -20 | 107.72 | 2242 | 2.63 |
| 56 | -25 | 108.56 | 1934 | 2.42 |

Fig.3

| working condition | | two-stage compression cooling system | | |
|---|---|---|---|---|
| condensation temperature /°C | evaporation temperature /°C | discharge temperature | volumetric cooling capacity | energy efficiency ratio |
| 56 | -10 | 108.74 | 3109 | 3.18 |
| 56 | -15 | 111.58 | 2613 | 3.02 |
| 56 | -20 | 114.82 | 2388 | 2.74 |
| 56 | -25 | 118.55 | 2071 | 2.51 |

Fig.4

| working condition | | air-supplementing enthalpy-increasing cooling system | | |
|---|---|---|---|---|
| condensation temperature /°C | evaporation temperature /°C | discharge temperature | volumetric cooling capacity | energy efficiency ratio |
| 56 | -10 | 114.45 | 3800 | 3.34 |
| 56 | -15 | 121.12 | 3317 | 3.15 |
| 56 | -20 | 129.02 | 2880 | 2.97 |
| 56 | -25 | 138.53 | 2487 | 2.81 |

Fig.5

| working condition | | cooling system with ejector arranged on discharge side of compressor | | |
|---|---|---|---|---|
| condensation temperature /°C | evaporation temperature /°C | discharge temperature | volumetric cooling capacity | energy efficiency ratio |
| 56 | -10 | 110.1675 | 3858.5 | 3.365 |
| 56 | -15 | 113.965 | 3326 | 3.23 |
| 56 | -20 | 118.37 | 2953 | 3.025 |
| 56 | -25 | 123.545 | 2555.5 | 2.855 |

Fig.6

AIR CONDITIONING SYSTEM

FIELD

The present disclosure belongs to the technical field of air conditioning, and specifically provides an air conditioning system.

BACKGROUND

An air conditioning system is a system that can lower an indoor ambient temperature. Specifically, in a heating mode, the air conditioning system can raise the indoor ambient temperature, and in a cooling mode, the air conditioning system can lower the indoor ambient temperature. At present, air conditioning systems have been widely used in homes.

In the prior art, while improving the heating capacity of the air conditioning system, the energy efficiency ratio of the air conditioning system must also be considered, so as to ensure that the heating capacity of the air conditioning system can be improved and the air conditioning system can be more energy-saving. Therefore, in many existing air conditioning systems, two-stage compressors or air-supplementing enthalpy-increasing compressors have been used, which can improve the energy efficiency ratio of the air conditioning system to a certain extent. However, the costs of the two-stage compressors and air-supplementing enthalpy-increasing compressors are both very high, and the structures are complicated, making them not easy to repair.

Accordingly, there is a need for a new air conditioning system in the art to solve the above-mentioned problem.

SUMMARY

In order to solve the above-mentioned problem in the prior art, that is, to solve the problem that the two-stage compressors or air-supplementing enthalpy-increasing compressors used in existing air conditioning systems have high costs and complicated structures and are not easy to repair, the present disclosure provides an air conditioning system, which includes an indoor heat exchanger, an outdoor heat exchanger, a compressor, a throttling device, a four-way valve and an ejection device, wherein the indoor heat exchanger, the outdoor heat exchanger, the compressor and the throttling device constitute a closed-loop refrigerant circulation circuit, the four-way valve is configured to switch the air conditioning system between a cooling mode and a heating mode, and the ejection device is configured to be capable of being connected to a discharge side of the compressor when the air conditioning system executes the heating mode, so as to improve a heating effect of the air conditioning system.

In a preferred technical solution of the above air conditioning system, the ejection device includes an ejector, a first solenoid valve, a second solenoid valve, a third solenoid valve, and a fourth solenoid valve, wherein the second solenoid valve is arranged on a downstream side of the ejector, the third solenoid valve is arranged on an upstream side of the ejector, and the ejector, the second solenoid valve and the third solenoid valve constitute an ejection flow path which is connected between the discharge side of the compressor and the four-way valve; the first solenoid valve is arranged in parallel with the ejection flow path, and the fourth solenoid valve is connected between an ejection end of the ejector and the indoor heat exchanger.

In a preferred technical solution of the above air conditioning system, the ejection device includes an ejector, a first solenoid valve, a second solenoid valve, and a third solenoid valve, wherein the second solenoid valve is arranged on a downstream side of the ejector, and the third solenoid valve is arranged on an upstream side of the ejector; the ejector, the second solenoid valve and the third solenoid valve constitute an ejection flow path which is connected between the discharge side of the compressor and the four-way valve, and the first solenoid valve is arranged in parallel with the ejection flow path.

In a preferred technical solution of the above air conditioning system, the ejection device includes an ejector, a first solenoid valve, a second solenoid valve and a fourth solenoid valve, wherein the second solenoid valve is arranged on a downstream side of the ejector, and the ejector and the second solenoid valve constitute an ejection flow path which is connected between the discharge side of the compressor and the four-way valve; the first solenoid valve is arranged in parallel with the ejection flow path, and the fourth solenoid valve is connected between an ejection end of the ejector and the indoor heat exchanger.

In a preferred technical solution of the above air conditioning system, the ejection device includes an ejector, a first solenoid valve, a third solenoid valve and a fourth solenoid valve, wherein the third solenoid valve is arranged on an upstream side of the ejector, and the ejector and the third solenoid valve constitute an ejection flow path which is connected between the discharge side of the compressor and the four-way valve; the first solenoid valve is arranged in parallel with the ejection flow path, and the fourth solenoid valve is connected between an ejection end of the ejector and the indoor heat exchanger.

In a preferred technical solution of the above air conditioning system, the throttling device is an electronic expansion valve.

It can be understood by those skilled in the art that in the preferred technical solutions of the present disclosure, the ejection device is connected to the discharge side of the compressor when the air conditioning system executes the heating mode. With such an arrangement, the ejection device enables a low-pressure fluid to be mixed with a high-pressure fluid, and a turbulent diffusion effect of the jet flow can be utilized to increase the pressure of output fluid, so as to achieve the effect of two-stage pressurizing and improve the energy efficiency ratio of the air conditioning system, thereby improving the heating effect of the air conditioning system. Moreover, the stability of the compressor's operation will not be affected due to the unstable airflow of the ejection device; also, the properties of the compressor oil will not be affected, and the safety of the compressor's operation will not be affected. As compared with the existing air conditioning systems in which a two-stage compressor or an air-supplementing enthalpy-increasing compressor is used, the air conditioning system of the present disclosure has a lower cost and a simple structure, and is convenient for the maintenance personnel to inspect, repair and replace.

BRIEF DESCRIPTION OF THE DRAWINGS

FIG. 3 is a heating data table of an ordinary air conditioning system in the prior art;

FIG. 4 is a heating data table of a two-stage compression air conditioning system in the prior art;

FIG. 5 is a heating data table of an air-supplementing enthalpy-increasing air conditioning system in the prior art; and FIG. 6 is a heating data table of an air conditioning system in which an ejector is arranged on a discharge side of the compressor in the present disclosure.

DETAILED DESCRIPTION

Figure 1:
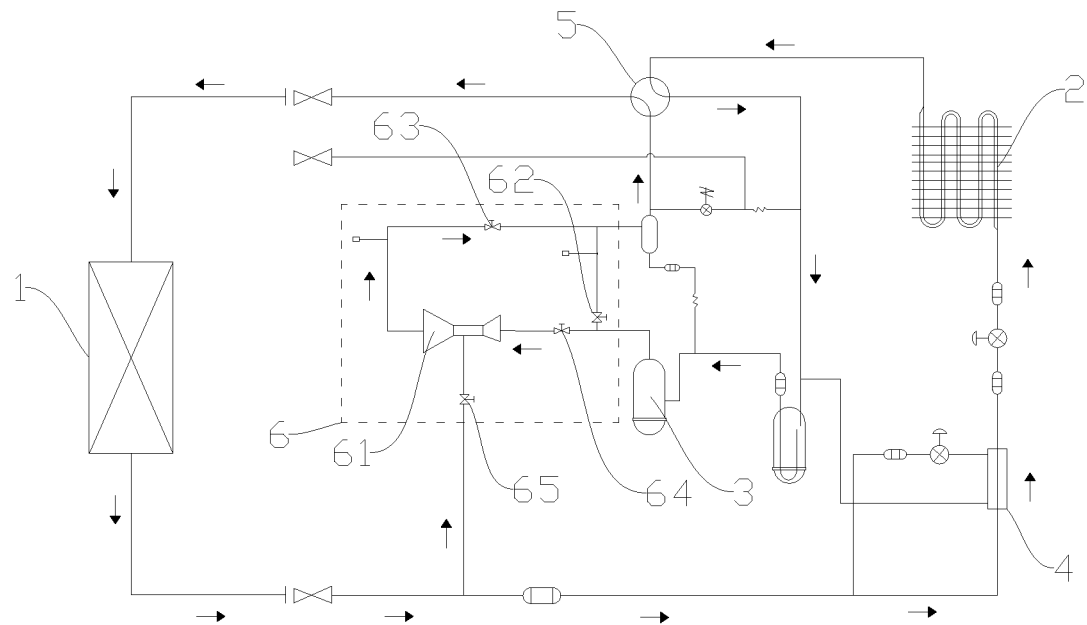
FIG. 1 is a first schematic structural view of a first embodiment of an air conditioning system of the present disclosure (in which the air conditioning system is executing a heating mode)

Preferred embodiments of the present disclosure will be described below with reference to the drawings. It should be understood by those skilled in the art that these embodiments are only used to explain the technical principles of the present disclosure, and are not intended to limit the scope of protection of the present disclosure.

It should be noted that in the description of the present disclosure, directional or positional relationships indicated by terms such as "in", "on", "below", "inside" and "outside" are based on the directional or positional relationships shown in the drawings. They are merely used for the convenience of description, and do not indicate or imply that the device or element involved must have a specific orientation, or be configured or operated in a specific orientation, and therefore they should not be construed as limiting the present disclosure. In addition, terms "first", "second", "third" and "fourth" are used for descriptive purpose only, and should not be construed as indicating or implying relative importance.

In addition, it should also be noted that in the description of the present disclosure, unless otherwise clearly specified and defined, terms "arrange", "connect" and "connection" should be understood in a broad sense; for example, the connection may be a fixed connection, or may also be a detachable connection, or an integral connection; it may be a mechanical connection, or an electrical connection; it may be a direct connection, or an indirect connection implemented through an intermediate medium, or it may be an internal communication between two elements. For those skilled in the art, the specific meaning of the above terms in the present disclosure can be understood according to specific situations.

Based on the problem pointed out in the "BACKGROUND OF THE INVENTION" that the two-stage compressors or air-supplementing enthalpy-increasing compressors used in existing air conditioning systems have high costs and complicated structures and are not easy to repair, the present disclosure provides an air conditioning system, which aims to achieve a lower cost and a simple structure of the air conditioning system lower, make it convenient for the maintenance personnel to inspect, repair and replace, and improve the energy efficiency ratio of the air conditioning system, so that the heating effect of the air conditioning system can be improved when it is executing the heating mode.

Figure 2:
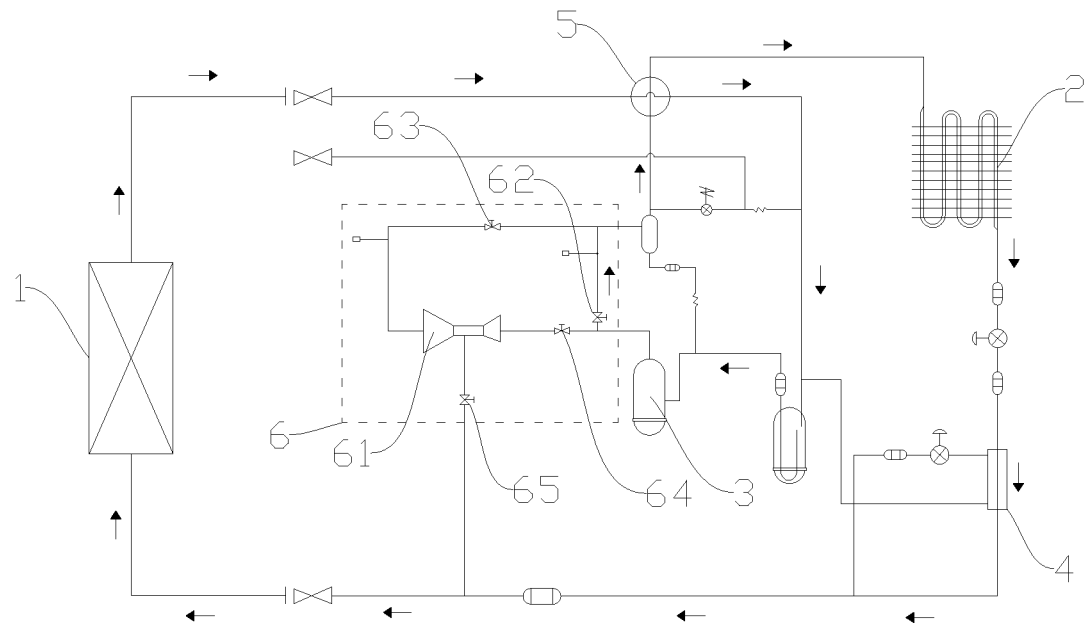
FIG. 2 is a second schematic structural view of the first embodiment of the air conditioning system of the present disclosure (in which the air conditioning system is executing a cooling mode)

Specifically, as shown in FIGS. 1 and 2, the air conditioning system of the present disclosure includes an indoor heat exchanger 1, an outdoor heat exchanger 2, a compressor 3, a throttling device 4, a four-way valve 5 and an ejection device 6. The indoor heat exchanger 1, the outdoor heat exchanger 2, the compressor 3 and the throttling device 4 constitute a closed-loop refrigerant circulation circuit, the four-way valve 5 is configured to switch the air conditioning system between a cooling mode and a heating mode, and the ejection device 6 is configured to be capable of being connected to a discharge side of the compressor 3 when the air conditioning system executes the heating mode, so as to improve a heating effect of the air conditioning system. The ejection device 6 may be in a form of a combination of an ejector 61 and multiple solenoid valves, or a combination of an ejector 61 and multiple manual valves, or in other forms. Those skilled in the art may flexibly set the specific structure of the ejection device 6 in practical applications, as long as the ejection device 6 can be connected to the discharge side of the compressor 3 when the air conditioning system is executing the heating mode. In addition, in the present disclosure, the throttling device 4 may be an electronic expansion valve, a manual expansion valve, or a capillary tube. Those skilled in the art may flexibly set the specific structure of the throttling device 4 in practical applications. The adjustments and changes to the specific structure of the throttling device 4 do not constitute limitations to the present disclosure, and should be covered within the scope of protection of the present disclosure. The technical solutions of the present disclosure will be described below in conjunction with four embodiments.

First Embodiment

As shown in FIGS. 1 and 2, the ejection device 6 includes an ejector 61, a first solenoid valve 62, a second solenoid valve 63, a third solenoid valve 64, and a fourth solenoid valve 65. The second solenoid valve 63 is arranged on a downstream side of the ejector 61, the third solenoid valve 64 is arranged on an upstream side of the ejector 61, and the ejector 61, the second solenoid valve 63 and the third solenoid valve 64 constitute an ejection flow path which is connected between the discharge side of the compressor 3 and the four-way valve 5. The first solenoid valve 62 is arranged in parallel with the ejection flow path, and the fourth solenoid valve 65 is connected between an ejection end of the ejector 61 and the indoor heat exchanger 1. Referring to FIG. 1, when the air conditioning system executes the heating mode, the first solenoid valve 62 is closed, and each of the second solenoid valve 63, the third solenoid valve 64 and the fourth solenoid valve 65 is opened. The refrigerant flowing out of the indoor heat exchanger 1 (which serves as a condenser in this case) is divided into two streams. A first stream of the refrigerant enters an ejection end of the ejector 61 through the fourth solenoid valve 65, and a second stream of the refrigerant passes through the throttling device 4, the outdoor heat exchanger 2 (which serves as an evaporator in this case) and the compressor 3 in sequence. The outdoor heat exchanger 2 converts the liquid-phase refrigerant into a gas-phase refrigerant by absorbing heat. The compressor 3 converts the gas-phase refrigerant into a high-pressure gas-phase refrigerant, and the high-pressure gas-phase refrigerant discharged from the compressor 3 enters the ejector 61 through the third solenoid valve 64. The ejector 61 mixes the low-pressure fluid with the high-pressure fluid (i.e., mixes the low-pressure liquid-phase refrigerant and the high-pressure gas-phase refrigerant), and uses a turbulent diffusion effect of the jet flow to increase the pressure of output fluid, thereby achieving the effect of two-stage pressurizing. That is, the pressurized fluid returns to the indoor heat exchanger 1 through the second solenoid valve 63 and the four-way valve 5, which improves the heating effect of the air conditioning system. Referring to FIG. 2, when the air conditioning system executes the cooling mode, the first solenoid valve 62 is opened, and each of the second solenoid valve 63, the third solenoid valve 64, and the fourth solenoid valve 65 is closed. The refrigerant flowing out of the indoor heat exchanger 1 (which serves as an evaporator in this case) enters the compressor 3 through the four-way valve 5. The high-pressure refrigerant discharged from the compressor 3 passes through the first solenoid valve 62, the four-way valve 5, the outdoor heat exchanger 2 (which serves as a condenser in this case) and the throttling device 4 in sequence, and finally returns to the indoor heat exchanger 1, so that the cooling of the air conditioning system is not affected. It should be noted that since the ejector 61 only works when the air conditioning system executes the heating mode, the positions of the second solenoid valve 63 and the third solenoid valve 64 in the ejection flow path are both set based on the direction of the refrigerant in the ejection flow path when the air conditioning system executes the heating mode; that is, arranging the second solenoid valve 63 on the downstream side of the ejector 61 means that the refrigerant first flows through the ejector 61 and then flows through the second solenoid valve 63, and arranging the third solenoid valve 64 on the upstream side of the ejector 61 means that the refrigerant first flows through the third solenoid valve 64 and then flows through the ejector 61.

Second Embodiment

As compared with the first embodiment, the fourth solenoid valve 65 of the ejection device 6 in the first embodiment can be removed in the present embodiment; that is, the ejection device 6 includes an ejector 61, a first solenoid valve 62, a second solenoid valve 63 and a third solenoid valve 64. The second solenoid valve 63 is arranged on the downstream side of the ejector 61, the third solenoid valve 64 is arranged on the upstream side of the ejector 61, and the ejector 61, the second solenoid valve 63 and the third solenoid valve 64 constitute an ejection flow path which is connected between the discharge side of the compressor 3 and the four-way valve 5. The first solenoid valve 62 is arranged in parallel with the ejection flow path. When the air conditioning system executes the heating mode, the first solenoid valve 62 is closed, and the second solenoid valve 63 and the third solenoid valve 64 are both opened. The refrigerant flowing out of the indoor heat exchanger 1 (which serves as a condenser in this case) is divided into two streams. A first stream of the refrigerant directly enters an ejection end of the ejector 61, and a second stream of the refrigerant passes through the throttling device 4, the outdoor heat exchanger 2 (which serves as an evaporator in this case) and the compressor 3 in sequence. The outdoor heat exchanger 2 converts the liquid-phase refrigerant into a gas-phase refrigerant by absorbing heat. The compressor 3 converts the gas-phase refrigerant into a high-pressure gas-phase refrigerant, and the high-pressure gas-phase refrigerant discharged from the compressor 3 enters the ejector 61 through the third solenoid valve 64. The ejector 61 mixes the low-pressure fluid with the high-pressure fluid (i.e., mixes the low-pressure liquid-phase refrigerant and the high-pressure gas-phase refrigerant), and uses a turbulent diffusion effect of the jet flow to increase the pressure of output fluid, thereby achieving the effect of two-stage pressurizing. That is, the pressurized fluid returns to the indoor heat exchanger 1 through the second solenoid valve 63 and the four-way valve 5, which improves the heating effect of the air conditioning system. When the air conditioning system executes the cooling mode, the first solenoid valve 62 is opened, and the second solenoid valve 63 and the third solenoid valve 64 are both closed. The refrigerant flowing out of the indoor heat exchanger 1 (which serves as an evaporator in this case) enters the compressor 3 through the four-way valve 5. The high-pressure refrigerant discharged from the compressor 3 passes through the first solenoid valve 62, the four-way valve 5, the outdoor heat exchanger 2 (which serves as a condenser in this case) and the throttling device 4 in sequence, and finally returns to the indoor heat exchanger 1, so that the cooling of the air conditioning system is not affected. It should be noted that since the ejector 61 only works when the air conditioning system executes the heating mode, the positions of the second solenoid valve 63 and the third solenoid valve 64 in the ejection flow path are both set based on the direction of the refrigerant in the ejection flow path when the air conditioning system executes the heating mode; that is, arranging the second solenoid valve 63 on the downstream side of the ejector 61 means that the refrigerant first flows through the ejector 61 and then flows through the second solenoid valve 63, and arranging the third solenoid valve 64 on the upstream side of the ejector 61 means that the refrigerant first flows through the third solenoid valve 64 and then flows through the ejector 61.

Third Embodiment

As compared with the first embodiment, the third solenoid valve 64 of the ejection device 6 in the first embodiment can be removed in the present embodiment; that is, the ejection device 6 includes an ejector 61, a first solenoid valve 62, a second solenoid valve 63 and a fourth solenoid valve 65. The second solenoid valve 63 is arranged on the downstream side of the ejector 61, and the ejector 61 and the second solenoid valve 63 constitute an ejection flow path which is connected between the discharge side of the compressor 3 and the four-way valve 5; the first solenoid valve 62 is arranged in parallel with the ejection flow path, and the fourth solenoid valve 65 is connected between an ejection end of the ejector 61 and the indoor heat exchanger 1. When the air conditioning system executes the heating mode, the first solenoid valve 62 is closed, and the second solenoid valve 63 and the fourth solenoid valve 65 are both opened. The refrigerant flowing out of the indoor heat exchanger 1 (which serves as a condenser in this case) is divided into two streams. A first stream of the refrigerant enters the ejection end of the ejector 61 through the fourth solenoid valve 65, and a second stream of the refrigerant passes through the throttling device 4, the outdoor heat exchanger 2 (which serves as an evaporator in this case) and the compressor 3 in sequence. The outdoor heat exchanger 2 converts the liquid-phase refrigerant into a gas-phase refrigerant by absorbing heat. The compressor 3 converts the gas-phase refrigerant into a high-pressure gas-phase refrigerant, and the high-pressure gas-phase refrigerant discharged from the compressor 3 directly enters the ejector 61. The ejector 61 mixes the low-pressure fluid with the high-pressure fluid (i.e., mixes the low-pressure liquid-phase refrigerant and the high-pressure gas-phase refrigerant), and uses a turbulent diffusion effect of the jet flow to increase the pressure of output fluid, thereby achieving the effect of two-stage pressurizing. That is, the pressurized fluid returns to the indoor heat exchanger 1 through the second solenoid valve 63 and the four-way valve 5, which improves the heating effect of the air conditioning system. When the air conditioning system executes the cooling mode, the first solenoid valve 62 is opened, and the second solenoid valve 63 and the fourth solenoid valve 65 are both closed. The refrigerant flowing out of the indoor heat exchanger 1 (which serves as an evaporator in this case) enters the compressor 3 through the four-way valve 5. The high-pressure refrigerant discharged from the compressor 3 passes through the first solenoid valve 62, the four-way valve 5, the outdoor heat exchanger 2 (which serves as a condenser in this case) and the throttling device 4 in sequence, and finally returns to the indoor heat exchanger 1, so that the cooling of the air conditioning system is not affected. It should be noted that since the ejector 61 only works when the air conditioning system executes the heating mode, the position of the second solenoid valve 63 in the ejection flow path is set based on the direction of the refrigerant in the ejection flow path when the air conditioning system executes the heating mode; that is, arranging the second solenoid valve 63 on the downstream side of the ejector 61 means that the refrigerant first flows through the ejector 61 and then flows through the second solenoid valve 63.

Fourth Embodiment

As compared with the first embodiment, the second solenoid valve 63 of the ejection device 6 in the first embodiment can be removed in the present embodiment; that is, the ejection device 6 includes an ejector 61, a first solenoid valve 62, a third solenoid valve 64 and a fourth solenoid valve 65. The third solenoid valve 64 is arranged on an upstream side of the ejector 61, and the ejector 61 and the third solenoid valve 64 constitute an ejection flow path which is connected between the discharge side of the compressor 3 and the four-way valve 5; the first solenoid valve 62 is arranged in parallel with the ejection flow path, and the fourth solenoid valve 65 is connected between an ejection end of the ejector 61 and the indoor heat exchanger 1. When the air conditioning system executes the heating mode, the first solenoid valve 62 is closed, and the third solenoid valve 64 and the fourth solenoid valve 65 are both opened. The refrigerant flowing out of the indoor heat exchanger 1 (which serves as a condenser in this case) is divided into two streams. A first stream of the refrigerant enters the ejection end of the ejector 61 through the fourth solenoid valve 65, and a second stream of the refrigerant passes through the throttling device 4, the outdoor heat exchanger 2 (which serves as an evaporator in this case) and the compressor 3 in sequence. The outdoor heat exchanger 2 converts the liquid-phase refrigerant into a gas-phase refrigerant by absorbing heat. The compressor 3 converts the gas-phase refrigerant into a high-pressure gas-phase refrigerant, and the high-pressure gas-phase refrigerant discharged from the compressor 3 enters the ejector 61 through the third solenoid valve 64. The ejector 61 mixes the low-pressure fluid with the high-pressure fluid (i.e., mixes the low-pressure liquid-phase refrigerant and the high-pressure gas-phase refrigerant), and uses a turbulent diffusion effect of the jet flow to increase the pressure of output fluid, thereby achieving the effect of two-stage pressurizing. That is, the pressurized fluid returns to the indoor heat exchanger 1 through the four-way valve 5, which improves the heating effect of the air conditioning system. When the air conditioning system executes the cooling mode, the first solenoid valve 62 is opened, and the third solenoid valve 64 and the fourth solenoid valve 65 are both closed. The refrigerant flowing out of the indoor heat exchanger 1 (which serves as an evaporator in this case) enters the compressor 3 through the four-way valve 5. The high-pressure refrigerant discharged from the compressor 3 passes through the first solenoid valve 62, the four-way valve 5, the outdoor heat exchanger 2 (which serves as a condenser in this case) and the throttling device 4 in sequence, and finally returns to the indoor heat exchanger 1, so that the cooling of the air conditioning system is not affected. It should be noted that since the ejector 61 only works when the air conditioning system executes the heating mode, the position of the third solenoid valve 64 in the ejection flow path is set based on the direction of the refrigerant in the ejection flow path when the air conditioning system executes the heating mode; that is, arranging the third solenoid valve 64 on the upstream side of the ejector 61 means that the refrigerant first flows through the third solenoid valve 64 and then flows through the ejector 61.

After repeated experiments, comparisons and analysis by the inventor, as compared with each of the ordinary air conditioning systems, the two-stage compression air conditioning systems and the air-supplementing enthalpy-increasing air conditioning system in the prior art, the energy efficiency ratio is significantly improved by using the air conditioning system of the present disclosure. Comparisons between the energy efficiency ratio of the ejection type air conditioning system and that of the ordinary air conditioning systems, the two-stage compression air conditioning systems and the air-supplementing enthalpy-increasing air conditioning system in the prior art will be made respectively below through related experimental data. In order to make the comparisons under the same working conditions, the condensation temperature when the air conditioning system executes the heating mode is set to be 56° C., and the evaporation temperature is set to be −10° C., −15° C., −20° C. and −25° C. respectively. The data obtained from the final experiments are shown in FIGS. 3 to 6.

As shown in FIGS. 3 and 6, the energy efficiency ratio of the air conditioning system of the present disclosure is greatly improved as compared with the energy efficiency ratio of the ordinary air conditioning system in the prior art. According to calculations, the energy efficiency ratio can be improved by up to 18%.

As shown in FIGS. 4 and 6, the energy efficiency ratio of the air conditioning system of the present disclosure is also greatly improved as compared with the two-stage compression air conditioning system in the prior art. According to calculations, the energy efficiency ratio can be improved by up to 12.7%.

As shown in FIGS. 5 and 6, the energy efficiency ratio of the air conditioning system of the present disclosure is obviously improved as compared with the air-supplementing enthalpy-increasing air conditioning system in the prior art. According to calculations, the energy efficiency ratio can be improved by up to 2.54%

Hitherto, the technical solutions of the present disclosure have been described in conjunction with the accompanying drawings, but it is easily understood by those skilled in the art that the scope of protection of the present disclosure is obviously not limited to these specific embodiments. Without departing from the principle of the present disclosure, those skilled in the art can make equivalent changes or replacements to relevant technical features, and the technical solutions after these changes or replacements will fall within the scope of protection of the present disclosure.

What is claimed is:

1. An air conditioning system, comprising an indoor heat exchanger, an outdoor heat exchanger, a compressor, a throttling device, a four-way valve and an ejection device, wherein the indoor heat exchanger, the outdoor heat exchanger, the compressor and the throttling device form a closed-loop refrigerant circulation circuit, the four-way valve is configured to switch the air conditioning system between a cooling mode and a heating mode, wherein the ejection device comprises an ejector, a first solenoid valve, a second solenoid valve, a third solenoid valve, and a fourth solenoid valve; the second solenoid valve is arranged on a downstream side of the ejector, the third solenoid valve is arranged on an upstream side of the ejector, and the ejector, the second solenoid valve and the third solenoid valve constitute an ejection flow path which is connected between the discharge side of the compressor and the four-way valve; the first solenoid valve is arranged in parallel with the ejection flow path, and the fourth solenoid valve is connected between an ejection end of the ejector and the indoor heat exchanger; or wherein the ejection device comprises an ejector, a first solenoid valve, a second solenoid valve, and a third solenoid valve; the second solenoid valve is arranged on a downstream side of the ejector, and the third solenoid valve is arranged on an upstream side of the ejector; the ejector, the second solenoid valve and the third solenoid valve constitute an ejection flow path which is connected between the discharge side of the compressor and the four-way valve, and the first solenoid valve is arranged in parallel with the ejection flow path; or wherein the ejection device comprises an ejector, a first solenoid valve, a second solenoid valve and a fourth solenoid valve; the second solenoid valve is arranged on a downstream side of the ejector, and the ejector and the second solenoid valve constitute an ejection flow path which is connected between the discharge side of the compressor and the four-way valve; the first solenoid valve is arranged in parallel with the ejection flow path, and the fourth solenoid valve is connected between an ejection end of the ejector and the indoor heat exchanger; or wherein the ejection device comprises an ejector, a first solenoid valve, a third solenoid valve and a fourth solenoid valve; the third solenoid valve is arranged on an upstream side of the ejector, and the ejector and the third solenoid valve constitute an ejection flow path which is connected between the discharge side of the compressor and the four-way valve; the first solenoid valve is arranged in parallel with the ejection flow path, and the fourth solenoid valve is connected between an ejection end of the ejector and the indoor heat exchanger.

2. The air conditioning system according to claim 1, wherein the throttling device is an electronic expansion valve.

* * * * *